United States Patent
Hung (10) Patent No.: US 12,494,709 B2
(45) Date of Patent: Dec. 9, 2025

(54) MULTI-INPUT POWER SYSTEM

(71) Applicant: ASIAN POWER DEVICES INC., Taoyuan (TW)

(72) Inventor: Tsung-Liang Hung, Taoyuan (TW)

(73) Assignee: ASIAN POWER DEVICES INC., Taoyuan (TW)

( * ) Notice: Subject to any disclaimer, the term of this patent is extended or adjusted under 35 U.S.C. 154(b) by 25 days.

(21) Appl. No.: 18/540,166

(22) Filed: Dec. 14, 2023

(65) Prior Publication Data
US 2025/0167670 A1    May 22, 2025

(30) Foreign Application Priority Data
Nov. 17, 2023   (TW) .................. 112144541

(51) Int. Cl.
*H02M 3/04* (2006.01)
*H02M 1/42* (2007.01)
*H02M 3/155* (2006.01)
*H02M 7/08* (2006.01)

(52) U.S. Cl.
CPC ......... *H02M 1/4208* (2013.01); *H02M 3/155* (2013.01); *H02M 7/08* (2013.01)

(58) Field of Classification Search
CPC ................................................. H02M 1/4208
See application file for complete search history.

(56) References Cited

U.S. PATENT DOCUMENTS

| 6,246,222 B1* | 6/2001 | Nilles | H02M 3/1584 323/283 |
| 2017/0264190 A1* | 9/2017 | Unno | H02M 3/156 |

* cited by examiner

*Primary Examiner* — Rexford N Barnie
*Assistant Examiner* — Esayas G Yeshaw
(74) *Attorney, Agent, or Firm* — MUNCY, GEISSLER, OLDS & LOWE, P.C.

(57) ABSTRACT

A multi-input power system receives at least two input power sources, and includes at least two filter-rectification circuits, a switching switch, a boost power factor correction circuit, a DC-to-DC conversion circuit, a determination circuit, and a switch control circuit. The at least two filter-rectification circuits correspondingly convert the at least two input power sources into at least two rectified voltages. The switching switch switches one of the at least two rectified voltages. The determination circuit receives at least two power information, and determines at least two power supply status of the at least two input power sources according to the at least two power information to generate a determination signal. The switch control circuit receives the determination signal to generate a switch control signal to control the switching switch so as to switch one of the at least two rectification voltages.

9 Claims, 5 Drawing Sheets

MULTI-INPUT POWER SYSTEM

BACKGROUND

Technical Field

The present disclosure relates to a multi-input power system, and more particularly to a multi-input power system with switchable input power sources.

Description of Related Art

The statements in this section merely provide background information related to the present disclosure and do not necessarily constitute prior art.

Figure 1:
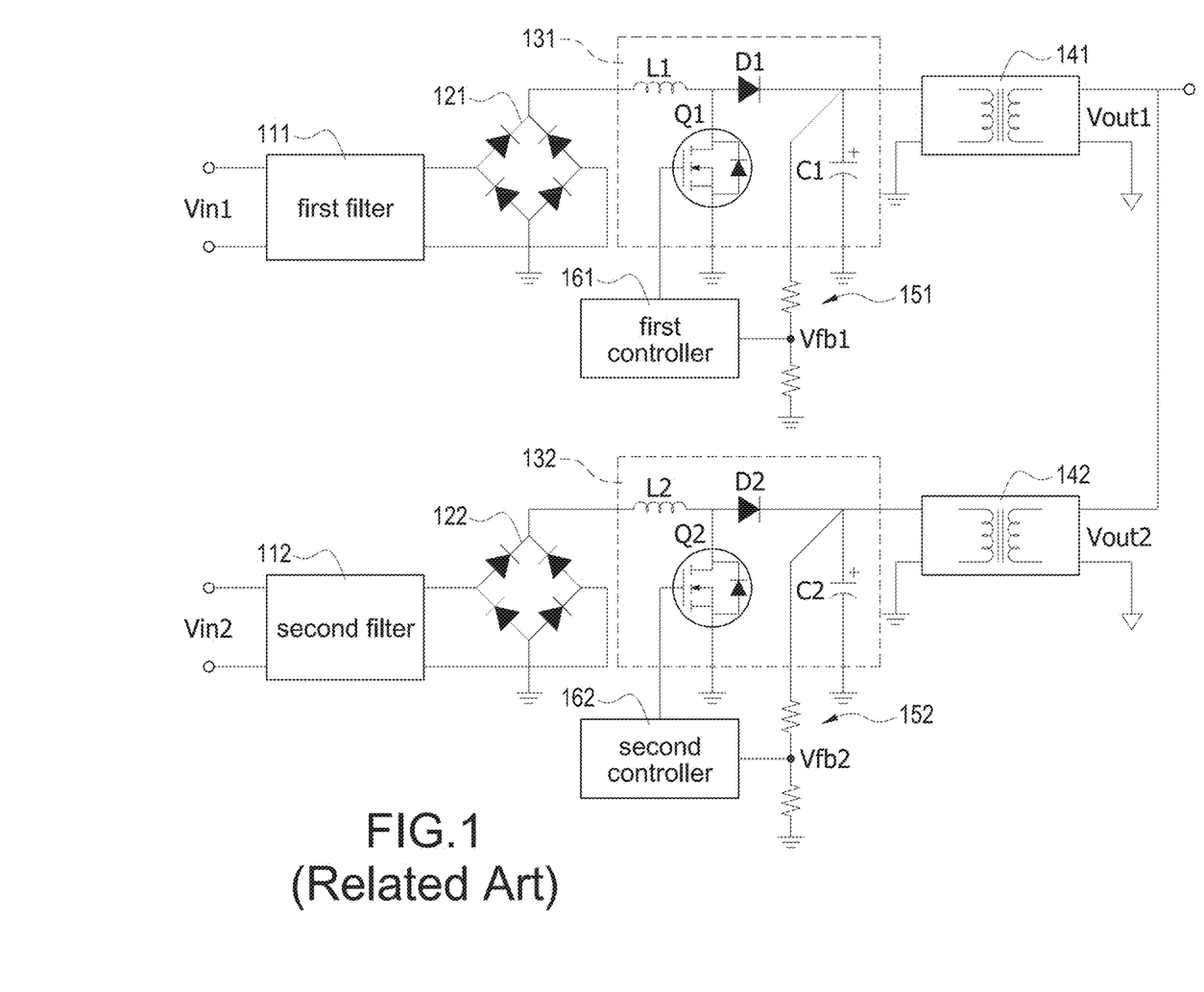
FIG. 1 is a block circuit diagram of a related-art dual-input switching power converter.

Please refer to FIG. 1, which shows a block circuit diagram of a related-art dual-input switching power converter. Specifically, it shows a dual-input switching power converter structure applied to an alternating current (AC), with two converters operating completely independently. Each independently operating power converter has a front-stage PFC (power factor correction) converter and a rear-stage DC-to-DC converter. In other words, the AC dual-input switching power converter shown in FIG. 1 is composed of two front-stage PFC converters and two rear-stage DC-to-DC converters. The two DC-to-DC converters are connected only at their output sides, and the characteristic is that the two converters can simultaneously operate, or by one of them, that is, one front-stage PFC corresponding to the AC input and one rear-stage DC-to-DC converter are used.

The front-stage PFC converter can perform power factor correction for its respective AC power source, and the secondary side of the rear-stage DC-DC converter outputs power for supplying the power required by the system.

Specifically, as shown in FIG. 1, the dual-input switching power converter mainly includes a first PFC converter 131, a second PFC converter 132, a first DC-to-DC converter 141, and a second DC-to-DC converter 142. The first AC power source Vin1 is filtered and rectified by a first filter 111 and a first rectifier 121, and the first PFC converter 131 converts (for example, steps up) the filtered and rectified voltage, and then the first DC-to-DC converter 141 converts the stepped-up voltage to generate a first output voltage Vout1 for supplying the power required by the system.

Similarly, the second AC power source Vin2 is filtered and rectified by a second filter 112 and a second rectifier 122, and the second PFC converter 132 converts (for example, steps up) the filtered and rectified voltage, and then the second DC-to-DC converter 142 converts the stepped-up voltage to generate a second output voltage Vout2 for supplying the power required by the system.

However, since the related-art dual-input switching power converter requires two PFC converters (i.e., the first PFC converter 131 and the second PFC converter 132) and two DC-to-DC converters (i.e., the first DC-to-DC converter 141 and the second DC-to-DC converter 142), the circuit cost is high and the control complexity is high.

Therefore, how to design a multi-input power system to solve problems and technical bottlenecks in the existing technology has become a critical topic in this field.

SUMMARY

An objective of the present disclosure is to provide a multi-input power system. The multi-input power system receives at least two input power sources, and each input power source is an AC power source. The multi-input power system includes at least two filter-rectification circuits, a switching switch, a boost power factor correction circuit, a DC-to-DC conversion circuit, a determination circuit, and a switch control circuit. The at least two filter-rectification circuits respectively receive the at least two input power sources, and convert the at least two input power sources into at least two rectified voltages. The switching switch is connected to the at least two filter-rectification circuits, and receives the at least two rectified voltages and switch one of the at least two rectified voltages. The boost power factor correction circuit receives the rectified voltage provided from the switching switch, and performs a power factor correction to the rectified voltage to provide a conversion voltage. The DC-to-DC conversion circuit is connected to the boost power factor correction circuit and the DC-to-DC conversion circuit converts the conversion voltage into an output voltage. The determination circuit receives at least two power information corresponding to the at least two input power sources, and determines at least two power supply status of the at least two input power sources according to the at least two power information to generate a determination signal. The switch control circuit is connected to the determination circuit, and receives the determination signal to generate a switch control signal to control the switching switch so as to switch one of the at least two rectified voltages by the switching switch.

In one embodiment, the switching switch is a multi-terminal switch, and the switching switch includes a common terminal and at least two connection terminals. The common terminal is connected to the boost power factor correction circuit, and the at least two connection terminals are respectively connected to the at least two filter-rectification circuits.

In one embodiment, the number of the at least two input power sources is two; the number of the at least two filter-rectification circuits is two, including a first filter-rectification circuit and a second filter-rectification circuit; the at least two connection terminals include a first connection terminal and a second connection terminal. When the common terminal is connected to the first connection terminal, the boost power factor correction circuit is connected to the first filter-rectification circuit; when the common terminal is connected to the second connection terminal, the boost power factor correction circuit is connected to the second filter-rectification circuit.

In one embodiment, the boost power factor correction circuit includes an inductor, a switch, a diode, and a capacitor. The inductor includes a first terminal and a second terminal. The switch includes a first power terminal, a second power terminal, and a control terminal. The diode includes an anode and a cathode. The capacitor includes a first terminal and a second terminal. The first terminal of the inductor is connected to the common terminal of the switching switch, and the second terminal of the inductor is connected to the first power terminal of the switch and the anode of the diode; the cathode of the diode is connected to the first terminal of the capacitor; the second power terminal of the switch and the second terminal of the capacitor are grounded.

In one embodiment, the boost power factor correction circuit further includes a voltage-dividing circuit and a second controller. The voltage-dividing circuit receives the conversion voltage outputted from the boost power factor correction circuit, and divides the conversion voltage to acquire a divided voltage. The second controller receives the divided voltage, and controls a turned-on time and/or a turned-off time of the switch according to the divided voltage so as to control the conversion voltage.

In one embodiment, the voltage-dividing circuit includes a first voltage-dividing resistor and a second voltage-dividing resistor. The voltage-dividing circuit receives the conversion voltage outputted from the boost power factor correction circuit, and divides the conversion voltage according to a resistance ratio between the first voltage-dividing resistor and the second voltage-dividing resistor to generate the divided voltage across the second voltage-dividing resistor.

In one embodiment, the determination circuit is a comparator. The determination circuit compares the at least two power information to generate the determination signal.

In one embodiment, the switch control circuit generates the switch control signal to control the switching switch to determine one of the at least two input power sources as a main power source, and the remaining input power source as backup power sources.

In one embodiment, the at least two power information are the size of the at least two input power sources, the size of the at least two rectified voltages, or dynamic power ratios of the at least two input power sources.

Another objective of the present disclosure is to provide a multi-input power system. The multi-input power system receives at least two input power sources, and each input power source is a DC power source. The multi-input power system includes a switching switch, a DC-to-DC conversion circuit, a determination circuit, and a switch control circuit. The switching switch is connected to the at least two input power sources, and switches one of the at least two input power sources. The DC-to-DC conversion circuit receives the input power source provided from the switching switch, and converts the input power source into an output voltage. The determination circuit respectively receives at least two power information corresponding to the at least two input power sources, and determines at least two power supply status of the at least two input power sources according to the at least two power information to generate a determination signal. The switch control circuit is connected to the determination circuit, and receives the determination signal to generate a switch control signal to control the switching switch so as to switch one of the at least two input power sources by the switching switch.

In one embodiment, the switching switch is a multi-terminal switch, and the switching switch includes a common terminal and at least two connection terminals. The common terminal is connected to the DC-to-DC conversion circuit, and the at least two connection terminals are respectively connected to the at least two input power sources.

In one embodiment, the number of the at least two input power sources is two, including a first input power source and a second input power source; the at least two connection terminals include a first connection terminal and a second connection terminal. When the common terminal is connected to the first connection terminal, the DC-to-DC conversion circuit is connected to the first input power source; when the common terminal is connected to the second connection terminal, the DC-to-DC conversion circuit is connected to the second input power source.

In one embodiment, the determination circuit is a comparator. The determination circuit compares the at least two power information to generate the determination signal.

In one embodiment, the switch control circuit generates the switch control signal to control the switching switch to determine one of the at least two input power sources as a main power source, and the remaining input power source as backup power sources.

In one embodiment, the at least two power information are the size of the at least two input power sources or dynamic power ratios of the at least two input power sources.

Accordingly, the multi-input power system proposed by the present disclosure has the following characteristics and advantages: (1) since only one boost power factor correction circuits 30 and one DC-to-DC conversion circuit 40 are used, the overall power supply structure can be simplified with the advantages of minimum component cost and minimized volume; (2) since the power factor correction circuit has the characteristic that the conversion efficiency is proportional to the input voltage, when multiple input voltages are provided, higher conversion efficiency and/or better power supply quality can be achieved by selecting the input power source with a high voltage.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Reference will now be made to the drawing figures to describe the present disclosure in detail. It will be understood that the drawing figures and exemplified embodiments of present disclosure are not limited to the details thereof.

Figure 2:
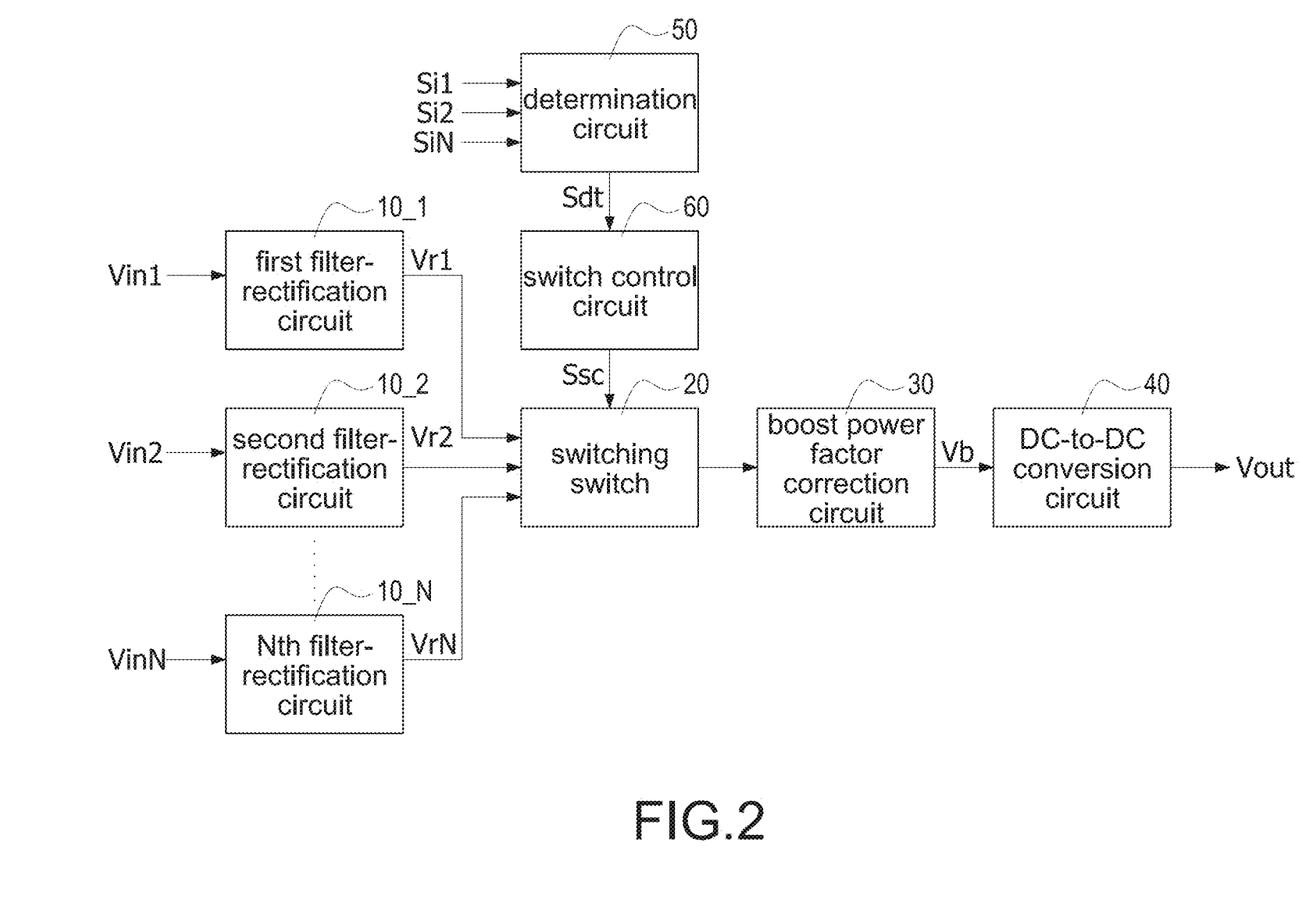
FIG. 2 is a block diagram of a multi-input power system according to a first embodiment of the present disclosure.

Please refer to FIG. 2, which shows a block diagram of a multi-input power system according to a first embodiment of the present disclosure. The multi-input power system receives at least two input power sources Vin1-VinN (including a first input power source Vin1, a second input power source Vin2, . . . , and a Nth input power source VinN), and the input power sources Vin1-VinN are not limited to AC power sources or DC power sources, and can also integrated AC and DC power sources. In this embodiment, each input power source Vin1-VinN is an AC power source. The multi-input power system includes at least two filter-rectification circuits 10_1-10_N (including a first filter-rectification circuit 10_1, a filter-rectification circuit 10_2, . . . , and a Nth filter-rectification circuit 10_N), a switching switch 20, a boost power factor correction circuit

30, a DC-to-DC conversion circuit 40, a determination circuit 50, and a switch control circuit 60.

The at least two filter-rectification circuits 10_1-10_N respectively receive the at least two input power sources Vin1-VinN, and convert the at least two input power sources Vin1-VinN into at least two rectified voltages Vr1-VrN. That is, the first filter-rectification circuit 10_1 receives the first input power source Vin1, and converts the first input power source Vin1 into a first rectified voltage Vr1. The second filter-rectification circuit 10_2 receives the second input power source Vin2, and converts the second input power source Vin2 into a second rectified voltage Vr2. Similarly, the Nth filter-rectification circuit 10_N receives the Nth input power source VinN, and converts the Nth input power source VinN into a Nth rectified voltage VrN.

The switching switch 20 is connected to the at least two filter-rectification circuits 10_1-10_N, and receive the at least two rectified voltages Vr1-VrN and switch one of the at least two rectified voltages Vr1-VrN. That is, the switching switch 20 receives the first rectified voltage Vr1, the second rectified voltage Vr2, . . . , and the Nth rectified voltage VrN, and switch one of the first rectified voltage Vr1, the second rectified voltage Vr2, . . . , and the Nth rectified voltage VrN.

The boost power factor correction circuit, i.e., boost PFC circuit is connected to the switching switch 20 to receive the rectified voltage Vr1-VrN provided from the switching switch 20, and performs a power factor correction to the rectified voltage Vr1-VrN to provide a conversion voltage Vb. The DC-to-DC conversion circuit 40 is connected to the boost power factor correction circuit 30, and converts the conversion voltage Vb into an output voltage Vout for supplying the power required by the system.

The determination circuit 50 receives at least two power information Si1-SiN corresponding to the at least two input power sources Vin1-VinN, and determines at least two power supply status of the at least two input power sources Vin1-VinN according to the at least two power information Si1-SiN to generate a determination signal Sdt. Specifically, the first input power source Vin1 is corresponding to a first power information Si1, the second input power source Vin2 is corresponding to a second power information Si2, . . . , and the Nth input power source VinN is corresponding to a Nth power information SiN. In particular, the at least two power information are, for example but not limited to, the size of the at least two input power sources, the size of the at least two rectified voltages, or dynamic power ratios of the at least two input power sources. However, the present disclosure is not limited to this information. All electrical information related to the input power source may be used as the power information Si1-SiN of the present disclosure. Therefore, the determination circuit 50 determines at least two power supply status of the at least two input power sources Vin1-VinN according to the at least two power information Si1-SiN to generate the determination signal Sdt.

The switch control circuit 60 is connected to the determination circuit 50, and receives the determination signal Sdt to generate a switch control signal Ssc to control the switching switch 20 so as to switch one of the at least two rectified voltages Vr1-VrN by the switching switch 20.

Figure 3:
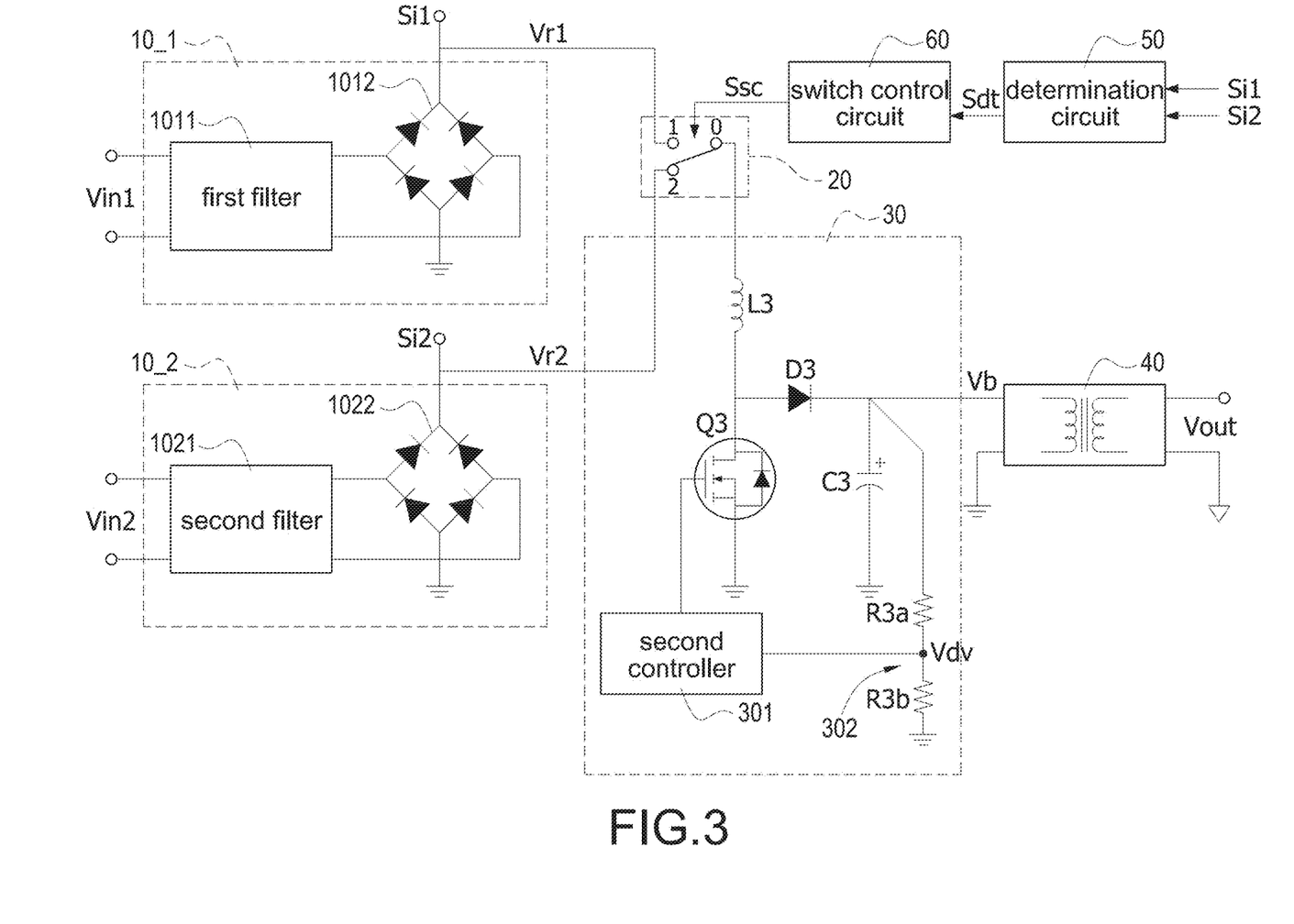
FIG. 3 is a block circuit diagram of the multi-input power system according to the first embodiment of the present disclosure.

Please refer to FIG. 3, which shows a block circuit diagram of the multi-input power system according to the first embodiment of the present disclosure. For the convenience of explanation, two input power sources are taken as an example in FIG. 3. The first filter-rectification circuit 10_1 receives the first input power source Vin1, and converts the first input power source Vin1 into the first rectified voltage Vr1. The second filter-rectification circuit 10_2 receives the second input power source Vin2, and converts the second input power source Vin2 into the second rectified voltage Vr2.

The switching switch 20 is connected to the first filter-rectification circuit 10_1 and the second filter-rectification circuit 10_2, and receives the first rectified voltage Vr1 and the second rectified voltage Vr2. In this embodiment, the switching switch 20 is a three-terminal switch, including a first connection terminal 1, a second connection terminal 2, and a common terminal 0. The first connection terminal 1 is connected to the first filter-rectification circuit 10_1, and receives the first rectified voltage Vr1; the second connection terminal 2 is connected to the second filter-rectification circuit 10_2, and receives the second rectified voltage Vr2. When the switch control signal Ssc generated by the switch control circuit 60 controls the common terminal 0 connecting to the first connection terminal 1, the switching switch 20 is connected to the first filter-rectification circuit 10_1 and receives the first rectified voltage Vr1. When the switch control signal Ssc generated by the switch control circuit 60 controls the common terminal 0 connecting to the second connection terminal 2, the switching switch 20 is connected to the second filter-rectification circuit 10_2 and receives the second rectified voltage Vr2.

The boost power factor correction circuit 30 is connected to the common terminal 0 of the switching switch 20. Specifically, the boost power factor correction circuit 30 includes an inductor L3, a switch Q3, a diode D3, and a capacitor C3. The inductor L3 includes a first terminal and a second terminal. The switch Q3 includes a first power terminal, a second power terminal, and a control terminal. The diode D3 includes an anode and a cathode. The capacitor C3 includes a first terminal and a second terminal. The first terminal of the inductor L3 is connected to the common terminal 0 of the switching switch 20, and the second terminal of the inductor L3 is connected to the first power terminal of the switch Q3 and the anode of the diode D3. The cathode of the diode D3 is connected to the first terminal of the capacitor C3. The second power terminal of the switch Q3 and the second terminal of the capacitor C3 are grounded.

The boost power factor correction circuit 30 further includes a second controller 301 and a voltage-dividing circuit 302. The voltage-dividing circuit 302 includes a first voltage-dividing resistor R3$a$ and a second voltage-dividing resistor R3$b$. The voltage-dividing circuit 302 receives the conversion voltage Vb outputted from the boost power factor correction circuit 30, and divides the conversion voltage Vb according to a resistance ratio between the first voltage-dividing resistor R3$a$ and the second voltage-dividing resistor R3$b$ to generate the divided voltage Vdv across the second voltage-dividing resistor R3$b$. That is, Vdv=Vb* (R3$b$/(R3$a$+R3$b$)).

The second controller 301 receives the divided voltage Vdv, and control a turned-on time and/or a turned-off time (i.e., a duty cycle) of the switch Q3 according to the divided voltage Vdv so as to control the conversion voltage Vb. Therefore, when the conversion voltage Vb is too low (that is, the received divided voltage Vdv is too low), the second controller 301 controls the duty cycle of the switch Q3 to increase, so that the boost power factor correction circuit 30 increases the first rectified voltage Vr1 or the second rectified voltage Vr2 to acquire an increased conversion voltage Vb. On the contrary, when the conversion voltage Vb is too high (that is, the received divided voltage Vdv is too high), the second controller 301 controls the duty cycle of the switch Q3 to decrease, so that the boost power factor correction circuit 30 decreases the first rectified voltage Vr1 or the second rectified voltage Vr2 to acquire a decreased conversion voltage Vb.

The DC-to-DC conversion circuit 40 is connected to the boost power factor correction circuit 30, and converts the conversion voltage Vb into the output voltage Vout for supplying the power required by the system.

As mentioned above, the determination circuit 50 receives the at least two power information Si1-SiN corresponding to the at least two input power sources Vin1-VinN, and determines at least two power supply status of the at least two input power sources Vin1-VinN according to the at least two power information Si1-SiN to generate the determination signal Sdt. In particular, the at least two power information are, for example but not limited to, the size of the at least two input power sources, the size of the at least two rectified voltages, or dynamic power ratios of the at least two input power sources. However, the present disclosure is not limited to this information. All electrical information related to the input power source may be used as the power information Si1-SiN of the present disclosure.

In this embodiment, as shown in FIG. 3, take the size of the at least two rectified voltages Vr1-VrN as an example to illustrate. It is assumed that the first rectified voltage Vr1 is greater than the second rectified voltage Vr2, therefore, the determination circuit 50 can determine that the first rectified voltage Vr1 is greater than the second rectified voltage Vr2 according to the first power information Si1 and the second power information Si2, for example but not limited, the first power information Si1 is greater than the second power information Si2. Therefore, the determination circuit 50 generates the determination signal Sdt and provides the determination signal Sdt to the switch control circuit 60 so that the switch control circuit 60 generates the switch control signal Ssc to control the switching switch 20. In this condition, the common terminal 0 of the switching switch 20 is switched to connect to the first connection terminal 1. Therefore, the first input power source Vin1 is used as a main power source, and the second input power source Vin2 is used as a backup power source. The first filter-rectification circuit 10_1 is connected to the boost power factor correction circuit 30 through the switching switch 20, and the first rectified voltage Vr1 outputs to the boost power factor correction circuit 30 through the switching switch 20, and then the boost power factor correction circuit 30 converts the first rectified voltage Vr1 into the conversion voltage Vb.

On the contrary, it is assumed that the first rectified voltage Vr1 is less than the second rectified voltage Vr2, therefore, the determination circuit 50 can determine that the first rectified voltage Vr1 is less than the second rectified voltage Vr2 according to the first power information Si1 and the second power information Si2, for example but not limited, the first power information Si1 is less than the second power information Si2. Therefore, the determination circuit 50 generates the determination signal Sdt and provides the determination signal Sdt to the switch control circuit 60 so that the switch control circuit 60 generates the switch control signal Ssc to control the switching switch 20. In this condition, the common terminal 0 of the switching switch 20 is switched to connect to the second connection terminal 2. Therefore, the second input power source Vin2 is used as the main power source, and the first input power source Vin1 is used as the backup power source. The second filter-rectification circuit 10_2 is connected to the boost power factor correction circuit 30 through the switching switch 20, and the second rectified voltage Vr2 outputs to the boost power factor correction circuit 30 through the switching switch 20, and then the boost power factor correction circuit 30 converts the second rectified voltage Vr1 into the conversion voltage Vb. Finally, the DC-to-DC conversion circuit 40 converts the conversion voltage Vb into the output voltage Vout for supplying the power required by the system.

Therefore, the determination circuit 50 receives the power information Si1-SiN (for example, the first power information Si1 and the second power information Si2 in this embodiment), and determines one of the input power sources Vin1-VinN (for example, the first input power source Vin1 and the second input power source Vin2) is switched to supply power. Accordingly, it is to use only one boost power factor correction circuits 30 and one DC-to-DC conversion circuit (compared to the related art, it is necessary to use two boost power factor correction circuits 30 and two DC-to-DC conversion circuits 40) to achieve the advantages of minimized component cost and size. Also, by determining the power information Si1-SiN, an input power source with a higher input voltage, or an input power source with a higher dynamic power ratio can be selected to acquire higher conversion efficiency and/or better power supply quality.

Figure 4:
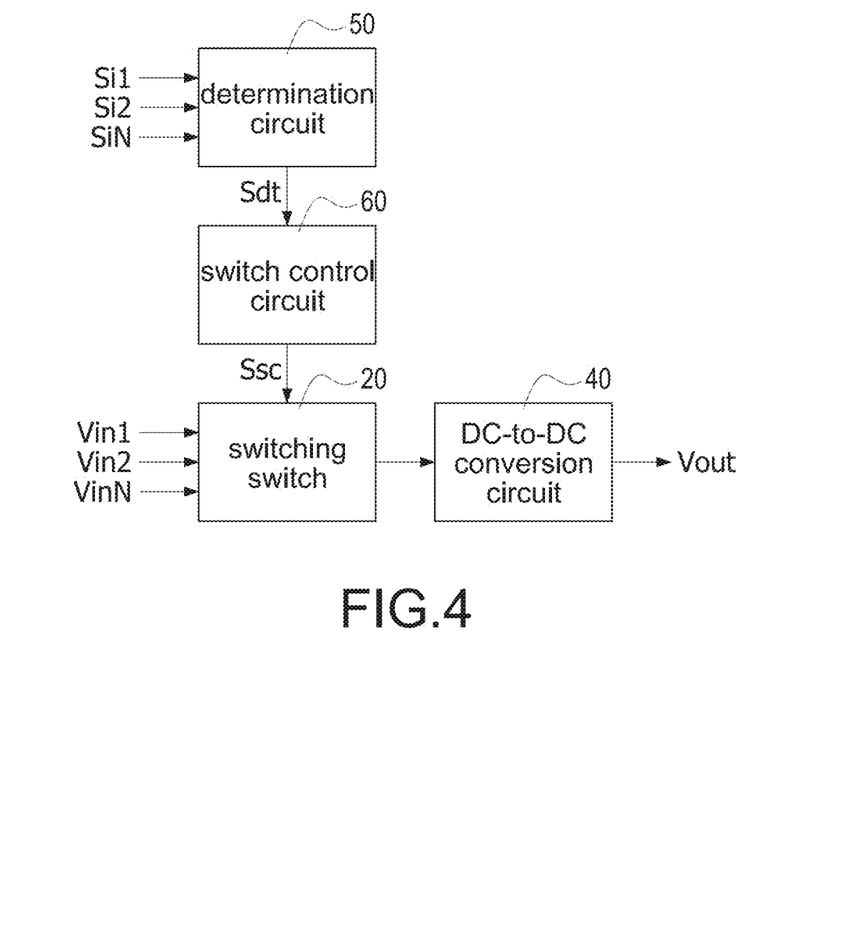
FIG. 4 is a block diagram of the multi-input power system according to a second embodiment of the present disclosure.
Figure 5:
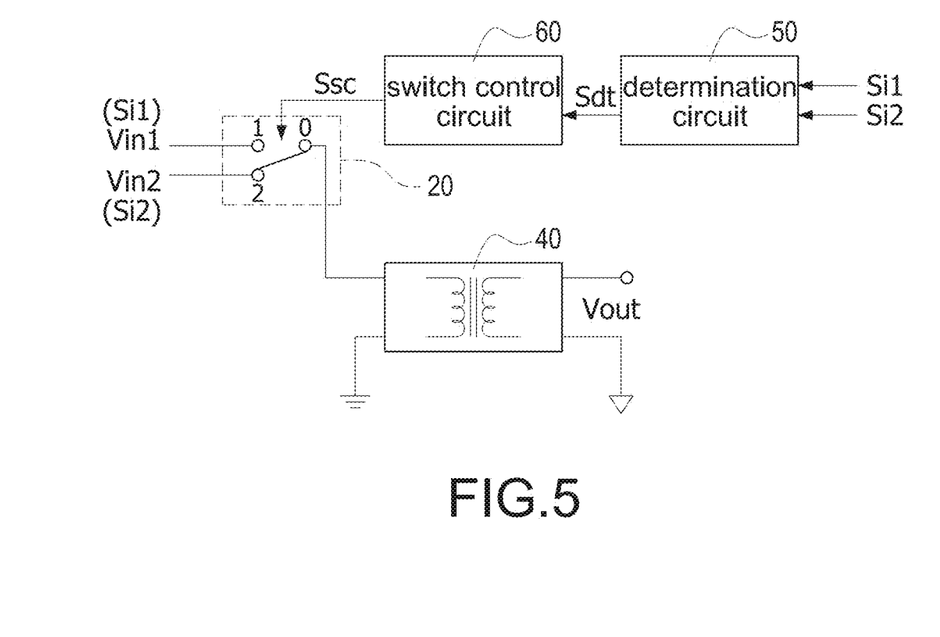
FIG. 5 is a block circuit diagram of the multi-input power system according to the second embodiment of the present disclosure.

Please refer to FIG. 4 and FIG. 5, which respectively show a block diagram or a block circuit diagram of the multi-input power system according to the second embodiment of the present disclosure. Compared with the first embodiment of FIG. 2 and FIG. 3, the major difference is that in the second embodiment, each input power source Vin1-VinN is a DC power source. Therefore, the multi-input power system includes the switching switch 20, the DC-to-DC conversion circuit 40, the determination circuit 50, and the switch control circuit 60. That is, in the second embodiment, the filter-rectification circuit and the boost power factor correction circuit may be omitted. In this condition, the switching switch 20 directly receives the input power sources Vin1-VinN. As shown in FIG. 5, the first connection terminal 1 of the switching switch 20 receives the first input power source Vin1, and the second connection terminal 2 of the switching switch 20 receives the second input power source Vin2. When the switch control signal Ssc generated by the switch control circuit 60 controls the common terminal 0 connecting to the first connection terminal 1, the first input power source Vin1 provides to the DC-to-DC conversion circuit 40, and the DC-to-DC conversion circuit 40 converts the first input power source Vin1 into the output voltage Vout for supplying the power required by the system. When the switch control signal Ssc generated by the switch control circuit 60 controls the common terminal 0 connecting to the first connection terminal 2, the second input power source Vin2 provides to the DC-to-DC conversion circuit 40, and the DC-to-DC conversion circuit 40 converts the second input power source Vin2 into the output voltage Vout for supplying the power required by the system.

The determination circuit 50 receives the at least two power information Si1-SiN corresponding to the at least two input power sources Vin1-VinN, and determines at least two power supply status of the at least two input power sources Vin1-VinN according to the at least two power information Si1-SiN to generate the determination signal Sdt. The switch control circuit 60 is connected to the determination circuit 50, and receives the determination signal Sdt to generate a switch control signal Ssc to control the switching switch 20. In particular, the at least two power information are, for example but not limited to, the size of the at least two input power sources or dynamic power ratios of the at least two input power sources. However, the present disclosure is not limited to this information. All electrical information related to the input power source may be used as the power information Si1-SiN of the present disclosure. As for the similarities between the second embodiment and the first embodiment, they will not be described in detail, and please refer to FIG. 2 and FIG. 3 and their corresponding descriptions.

In summary, the present disclosure has the following features and advantages:

1. Since only one boost power factor correction circuits 30 and one DC-to-DC conversion circuit 40 are used, the overall power supply structure can be simplified with the advantages of minimum component cost and minimized volume.
2. Since the power factor correction circuit has the characteristic that the conversion efficiency is proportional to the input voltage, when multiple input voltages are provided, higher conversion efficiency and/or better power supply quality can be achieved by selecting the input power source with a high voltage.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A multi-input power system configure to receive at least two input power sources, each input power source being an AC power source, the multi-input power system comprising:
at least two filter-rectification circuits configured to respectively receive the at least two input power sources, and convert the at least two input power sources into at least two rectified voltages,
a switching switch connected to the at least two filter-rectification circuits, and configured to receive the at least two rectified voltages and switch one of the at least two rectified voltages,
a boost power factor correction circuit configured to receive the rectified voltage provided from the switching switch, and perform a power factor correction to the rectified voltage to provide a conversion voltage,
a DC-to-DC conversion circuit connected to the boost power factor correction circuit and the DC-to-DC conversion circuit configured to convert the conversion voltage into an output voltage,
a determination circuit configured to receive at least two power information corresponding to the at least two input power sources, and determine at least two power supply status of the at least two input power sources according to the at least two power information to generate a determination signal, and
a switch control circuit connected to the determination circuit, and configured to receive the determination signal to generate a switch control signal to control the switching switch so as to switch one of the at least two rectified voltages by the switching switch.

2. The multi-input power system as claimed in claim 1, wherein the switching switch is a multi-terminal switch, and the switching switch comprises a common terminal and at least two connection terminals,
wherein the common terminal is connected to the boost power factor correction circuit, and the at least two connection terminals are respectively connected to the at least two filter-rectification circuits.

3. The multi-input power system as claimed in claim 2, wherein the number of the at least two input power sources is two; the number of the at least two filter-rectification circuits is two, comprising a first filter-rectification circuit and a second filter-rectification circuit; the at least two connection terminals comprise a first connection terminal and a second connection terminal,
wherein when the common terminal is connected to the first connection terminal, the boost power factor correction circuit is connected to the first filter-rectification circuit; when the common terminal is connected to the second connection terminal, the boost power factor correction circuit is connected to the second filter-rectification circuit.

4. The multi-input power system as claimed in claim 1, wherein the boost power factor correction circuit comprises:
an inductor comprising a first terminal and a second terminal,
a switch comprising a first power terminal, a second power terminal, and a control terminal,
a diode comprising an anode and a cathode, and
a capacitor comprising a first terminal and a second terminal,
wherein the first terminal of the inductor is connected to the common terminal of the switching switch, and the second terminal of the inductor is connected to the first power terminal of the switch and the anode of the diode; the cathode of the diode is connected to the first terminal of the capacitor; the second power terminal of the switch and the second terminal of the capacitor are grounded.

5. The multi-input power system as claimed in claim 4, wherein the boost power factor correction circuit further comprises:
a voltage-dividing circuit configured to receive the conversion voltage outputted from the boost power factor correction circuit, and divide the conversion voltage to acquire a divided voltage, and
a second controller configured to receive the divided voltage, and control a turned-on time and/or a turned-off time of the switch according to the divided voltage so as to control the conversion voltage.

6. The multi-input power system as claimed in claim 5, wherein the voltage-dividing circuit comprises:
a first voltage-dividing resistor and a second voltage-dividing resistor,
wherein the voltage-dividing circuit is configured to receive the conversion voltage outputted from the boost power factor correction circuit, and divide the conversion voltage according to a resistance ratio between the first voltage-dividing resistor and the second voltage-dividing resistor to generate the divided voltage across the second voltage-dividing resistor.

7. The multi-input power system as claimed in claim 1, wherein the determination circuit is a comparator,
wherein the determination circuit is configured to compare the at least two power information to generate the determination signal.

8. The multi-input power system as claimed in claim 1, wherein the switch control circuit is configured to generate the switch control signal to control the switching switch to determine one of the at least two input power sources as a main power source, and the remaining input power source as backup power sources.

9. The multi-input power system as claimed in claim 1, wherein the at least two power information are the size of the at least two input power sources, the size of the at least two rectified voltages, or dynamic power ratios of the at least two input power sources.

\* \* \* \* \*